United States Patent
Ohto et al.

(10) Patent No.: US 6,798,414 B2
(45) Date of Patent: Sep. 28, 2004

(54) ANIMATION GENERATION METHOD AND APPARATUS

(75) Inventors: Yasunori Ohto, Tokyo (JP); Yuichi Ueda, Tokyo (JP); Takashi Nozaki, Tokyo (JP); Yoichiro Serita, Tokyo (JP)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 10/014,152

(22) Filed: Dec. 7, 2001

(65) Prior Publication Data

US 2002/0089507 A1 Jul. 11, 2002

(30) Foreign Application Priority Data

Dec. 7, 2000 (JP) ...................................... P2000-372834

(51) Int. Cl.⁷ ............................................ G06T 15/00
(52) U.S. Cl. ...................................................... 345/473
(58) Field of Search ................................. 345/473, 474, 345/475

(56) References Cited

U.S. PATENT DOCUMENTS 5,852,450 A  * 12/1998 Thingvold .................. 345/473
6,661,420 B2 * 12/2003 Arai et al. .................. 345/474

FOREIGN PATENT DOCUMENTS

JP             2000-11199        1/2000

* cited by examiner

Primary Examiner—Almis R. Jankus
(74) Attorney, Agent, or Firm—Bell, Boyd & Lloyd LLP

(57) ABSTRACT

A base animation storing unit stores base animation, generated for each grid point in a range of adaptation with regard to a certain motion. A synthesizing unit starts adaptation motion synthesizing in the event that an end effector exists within the range of adaptation. The synthesizing unit calculates a weight array based on the position of a target and the position of each grid point, and adds base animation with the calculation results as linear addition coefficients, thereby generating the desired animation. Accordingly, animation cooperatively display with multiple objects of display can be effectively generated.

13 Claims, 15 Drawing Sheets

EDIT BASE ANIMATION

SYNTHESIZE ANIMATION

ADAPTATION ANIMATION   BASE ANIMATION $$M_P \Leftarrow aM_A + bM_B \cdots hM_H$$

WEIGHT ARRAY CONTROL $$p = z[y\{xA+(1-x)D\}+(1-y)\{xB+(1-x)C\}]$$
$$+(1-z)[y\{xE+(1-x)H\}+(1-y)\{xF+(1-x)G\}]$$

$$a = x\ y\ z, \quad e = x\ y\ (1-z),$$
$$b = x\ (1-y)\ z, \quad f = x\ (1-y)\ (1-z),$$
$$c = (1-x)(1-y)\ z, \quad g = (1-x)(1-y)\ (1-z),$$
$$d = (1-x)\ y\ z, \quad h = (1-x)\ y\ (1-z)$$

ND APPARATUS

BACKGROUND OF THE INVENTION

1. Field of the Invention

The present invention relates to the generation of two-dimensional or three-dimensional-appearing animation. In particular the invention relates to an animation generation apparatus and method for realizing cooperative actions with other animations. Animation created according to the apparatus and method of the present invention has broad application for creating and generating animations, games, image contents, and so forth.

2. Description of the Related Art

Conventionally, when generating interactive animation, the animations are constantly calculated using real-time inverse kinematics. Alternatively, all animation patterns conceivably occurring for the interaction animations are laid down and prepared beforehand.

In the past it has been difficult to obtain desired results with interactive animation generation using inverse kinematics, because the calculation costs are so great. Furthermore, the calculations often have multiple solutions. Attempts to reduce calculation costs by predicting all conceivable animation patterns beforehand have also proved unsuccessful, since predicting all such patterns is difficult, and in many cases impossible. Even when it is possible to predict all patterns, the amount of animations to be generated according to such predictions can be tremendous.

SUMMARY OF THE INVENTION

The present invention has been made in light of the above-described problems. Accordingly, it is an object of the invention to provide an animation generating apparatus and method for generating animation capable of cooperative actions with other animations, with low calculation costs.

According to one example of the present invention, parts of an animation requiring interactivity with other animations are first predicted. The cooperative relations between the interacting parts of animations are predicted. Next, an animation which satisfies the cooperative relations is created using inverse kinematics. This animation is used as a base animation. Finally, multiple base animations are synthesized according to the change in the object animation to generate adapted motion.

The present invention enables cooperative actions between animations to be related at the time the animations are generated. Also, the amount of calculations necessary to generate the animations can be reduced by implementing a technique using real-time inverse kinematics. Also, undesirable actions can be prevented beforehand.

With inverse kinematics calculations, the values of multiple joint angles must be obtained by providing the position of an end effector. To obtain such values it is necessary to simultaneously solve a number of polynomial equations. Also, there are cases wherein multiple joint angle sets are obtained because there are insufficient equations to solve all the equations simultaneously. If the calculations are being carried out in real-time, appropriate solutions cannot be found making it difficult to eliminate undesirable actions.

Conversely, with the present invention, joint angle sets which satisfy appropriate end effector positions can be obtained by the calculation of weighted addition degrees, from base animations calculated beforehand. Because the base animations used for the calculations are calculated beforehand, a joint angle set suitable for the particular end effector position can be selected. Also, animations obtained by inverse kinematics can be edited beforehand as appropriate. Further, the relationship between the end effector position and the generated animation is clear, so that undesirable actions can be prevented ahead of time.

In order to achieve the above objects, the animation generation method according to the present invention, for generating by coordinating animation of a predetermined object of display with animation of a separate object of display, executes a number of steps. A first step provides the storing of animation of a plurality of motions of the predetermined object of display. The plurality of motions correspond to a plurality of relations with animation of a separate object of display. The next step provides for synthesizing animation of a motion corresponding to the current relation, using animation of the plurality of motions, based on the current relation with animation of the separate object of display.

With this configuration, predetermined animations that are to be displayed can be prepared beforehand by representative relationships between certain objects of display and other objects of display. These can be used to easily generate new animation matching the current relationship.

The sets of animation to be synthesized may be partial animation corresponding to a part of the object of display.

The relationship between a predetermined object of display and a separate object of display may be, for example, the position of the separate object of display in a predetermined space area, moving synchronously with the predetermined object of display. For example, a plurality of sets of animation for an end effector of the predetermined object of display moving to a separate object of display situated at a representative point in the predetermined space area may be prepared beforehand, so as to synthesize animation of a separate object of display being situated at an arbitrary point in the predetermined space area from these multiple sets of animation.

Note that the present invention may be realized as a method or an apparatus. Also, computer-readable recording media storing programs used for realizing this method on a computer are also encompassed in the scope of the invention.

Additional features and advantages of the present invention are described in, and will be apparent from, the following Detailed Description of the Invention and the figures.

DETAILED DESCRIPTION OF THE INVENTION

Figure 5A:
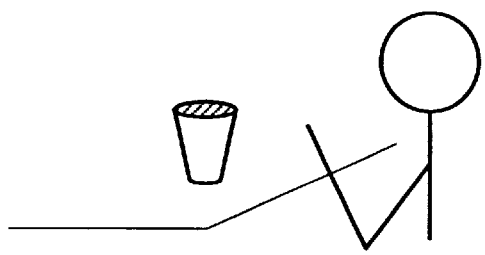
FIGS. 5A through 5C are diagrams describing animation to which the embodiment is applied.
Figure 5B:
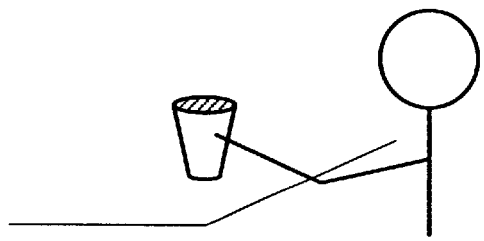
Figure 5C:
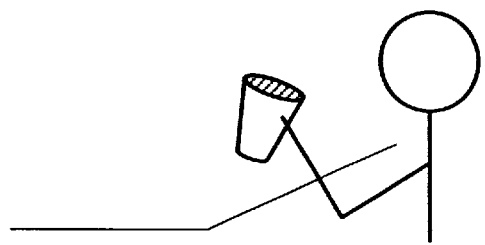
Figure 6A:
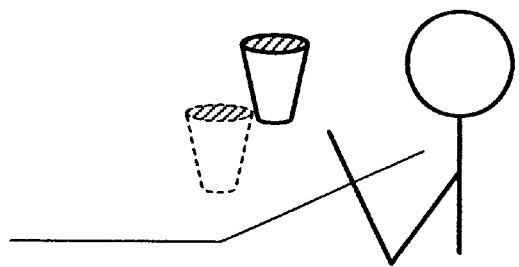
FIGS. 6A through 6C are diagrams describing other animation to which the embodiment is applied.
Figure 6B:
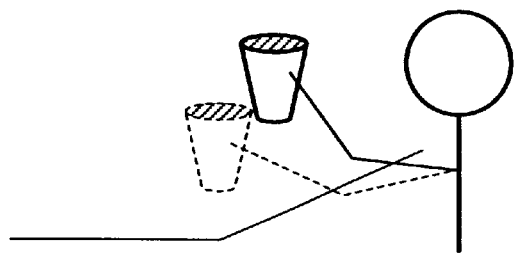
Figure 6C:
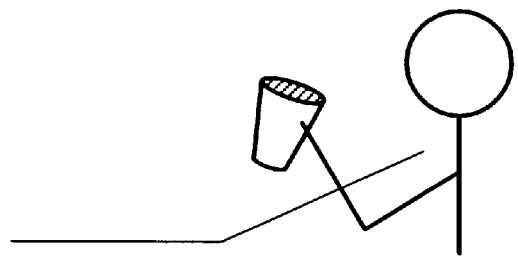

The following is a description of an embodiment of the present invention. In this embodiment, animated motion of a character (actor) touching a target (e.g., a glass) is adaptively generated at the time of execution. Such motion will hereafter be referred to as "execution-time adaptive motion". An apparatus for generating execution-time adaptive motion will be described, followed by a description of a method for generating animation adapted to the position of an object. This will be illustrated through an example of animation grasping an object. Through this example, a method will be described for automatically generating animated motion of a character taking in hand a glass on a table (FIGS. 5A through 5C). Further, the example will illustrate the execution of the method animation in the event that the position of the glass is different from the position of the character (FIGS. 6A through 6C).

Figure 1:
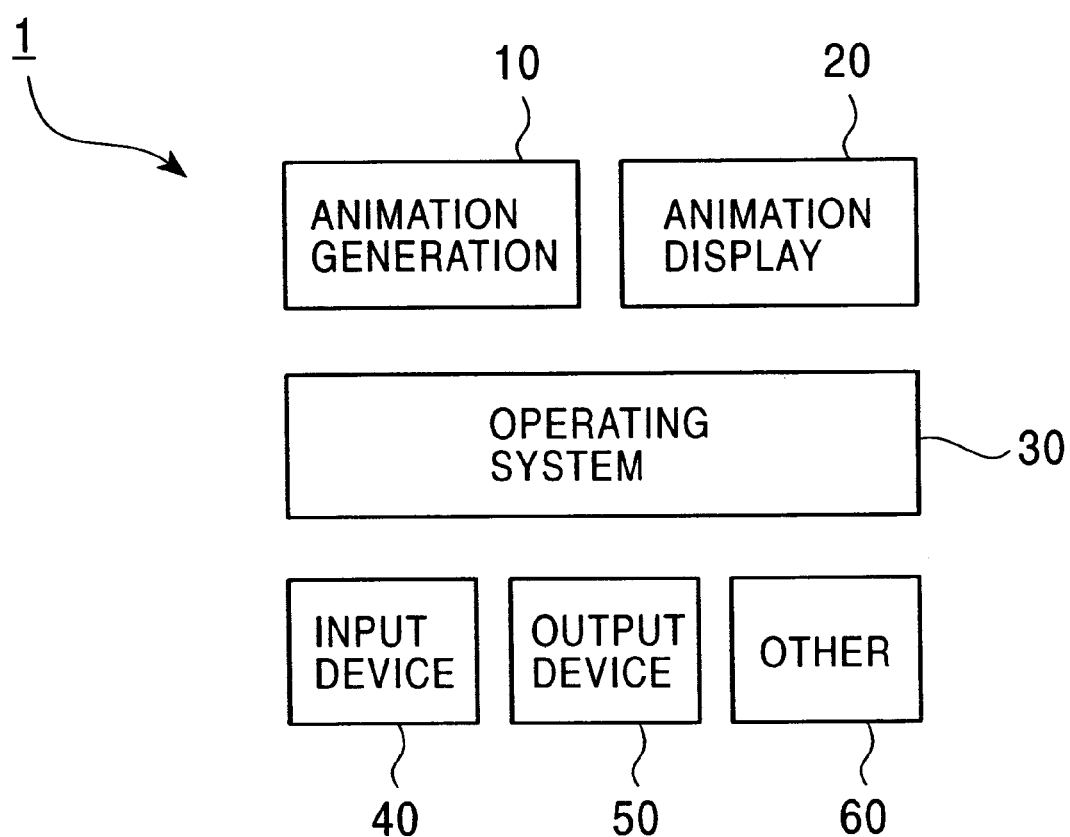
FIG. 1 is a system diagram illustrating an embodiment of the present invention in its entirety.

FIG. 1 is an overall illustration of an animation generating apparatus according to an embodiment of the present invention. According to this embodiment, the animation generating apparatus 1 includes an animation generating unit 10, animation display unit 20, operating system 30, input device 40, output device 50, other resources 60 (hardware and software), and so forth. The animation generating apparatus 1 may be put into actual use by installing the animation generating apparatus 1 in a game apparatus, personal computer, or the like. The animation generating apparatus 1 may also be used as an animation editing apparatus. The operating system 30 depends on the environment in which the animation generating apparatus 1 is installed. Operating system 30 may be a general-purpose operating system of a personal computer or the animation apparatus 1 may have its own built-in operating system. The animation generating unit 10 coordinates multiple sets of model animation, for generating animation. The animation display unit 20 receives the animation data and generates image data to output to the output device (display) 50. For example, the animation display unit 20 receives framework data from the animation generating unit 10 or the like and generates polygon data, and further performs rendering processing. Though not shown in the drawings, the rending processing and other processing may be executed using dedicated hardware.

Figure 2:
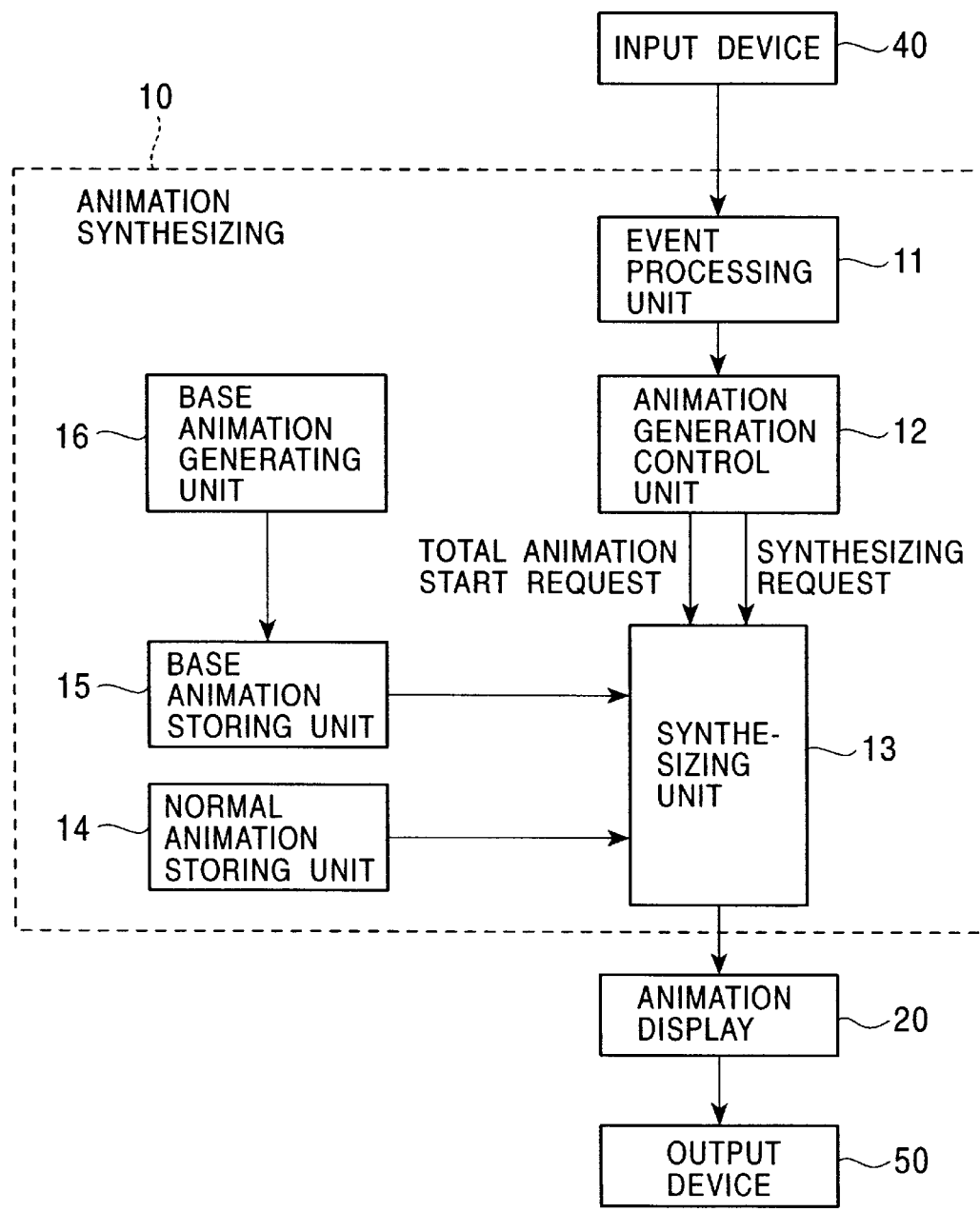
FIG. 2 is a block diagram schematically illustrating a configuration example of the animation generating unit 10 shown in FIG. 1.

FIG. 2 schematically illustrates the configuration of the animation generating unit 10 shown in FIG. 1. The animation generating unit 10 contains an event processing unit 11, an animation generation control unit 12, a synthesizing unit 13, a normal animation storing unit 14, a base animation storing unit 15, a base animation generating unit 16, as shown. The event processing unit 11 redirects event information (key input or controller operation) input from the input device 40 to the animation generation control unit 12. The animation generation control unit 12 supplies animation start requests and base animation synthesizing requests to the synthesizing unit 13, based on certain animation progress information. The normal animation storing unit 14 stores normal animation which dues not require cooperative action to be taken into consideration. The base animation storing unit 15 stores base animation for synthesizing animation which does require cooperative action to be taken into consideration. Details of the base animation will be described later. The base animation generating unit 16 generates base animation in advance, by inverse kinematics for example. In response to animation start requests and synthesizing requests from the normal animation storing unit 14, the synthesizing unit 13 extracts animation data from the normal animation storing unit 14 or extracts base animation from the base animation storing unit 15. The animation extracted from normal animation storage unit 14 is supplied to the animation display unit 20. Otherwise, the synthesizing unit 13 performs synthesizing computations on the base animation, thereby generating new animation data which is supplied to the animation display unit 20. The animation display unit 20 generates image data based on the animation data, and outputs this to the output device 50.

Figure 3:
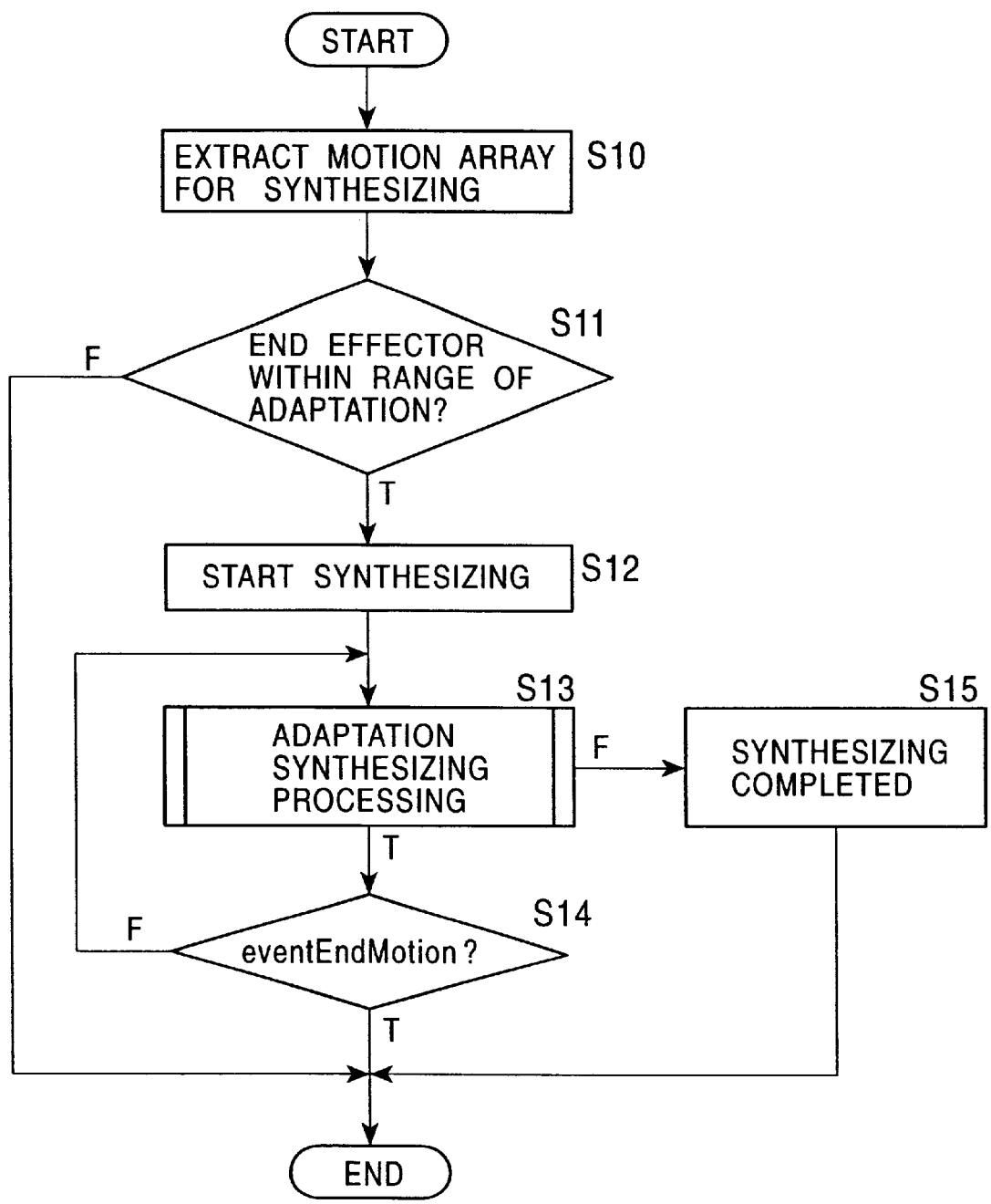
FIG. 3 is a flowchart describing the action of the embodiment shown in FIG. 1.
Figure 4:
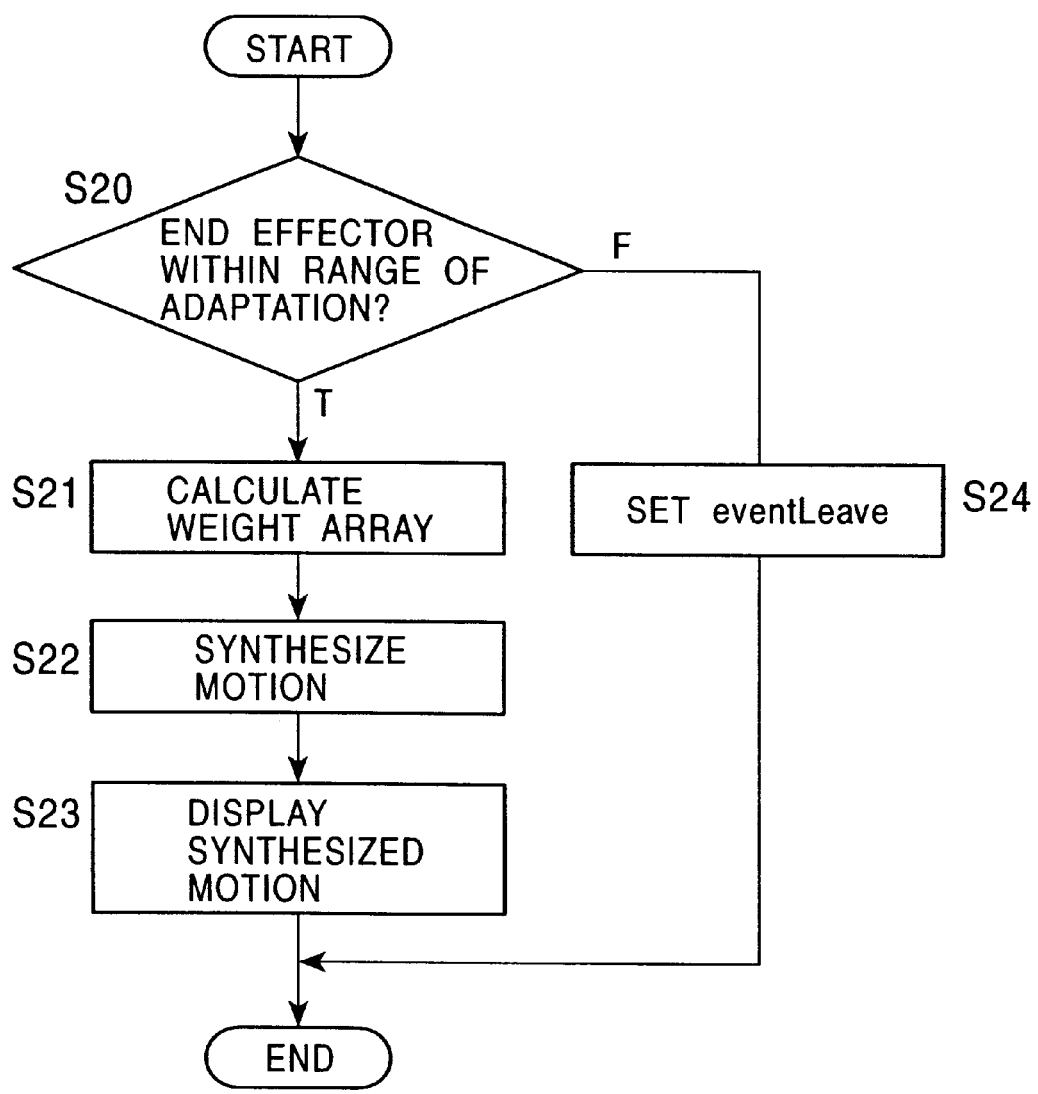
FIG. 4 is a flowchart describing a part of the procedures in FIG. 3.

FIG. 3 illustrates the operation of the animation generating unit 10 of FIG. 2, particularly the procedures for synthesizing new animation from base animation. FIG. 4 shows the details of the weight calculating step S21 in FIG. 3.

However, prior to describing the operations disclosed in FIGS. 3 and 4, the animation end effector, base animation, and such will first be described.

Figure 7:
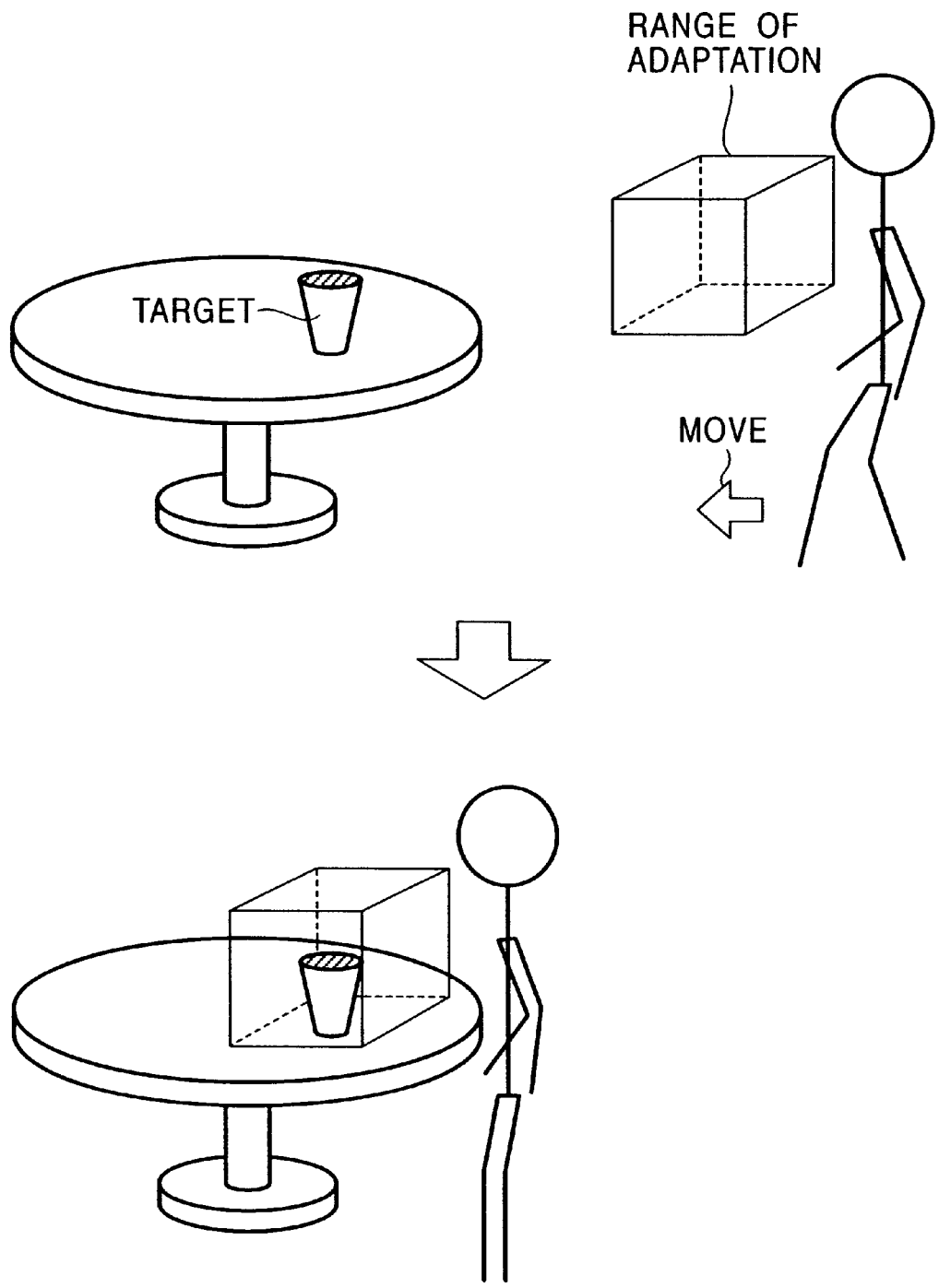
FIG. 7 is a diagram describing an adaptation range according to the present embodiment.
Figure 8:
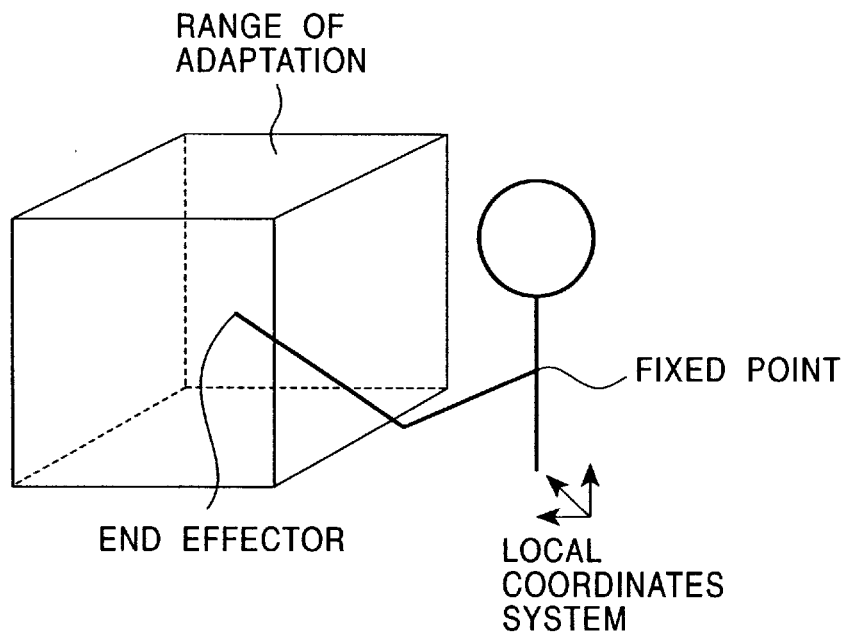
FIG. 8 is a diagram describing an adaptation range according to the present embodiment.

FIG. 8 shows the relationship between a local coordinate system and a fixed reference point of a character. FIG. 7 shows the range of adaptation in the event that the tip of the character's hand is the end effector. In this example, if the glass shown resting on the table is located within the range of adaptation, it becomes the target of the end effector. The movements of the character are generated, either automatically or under certain conditions, taking this into consideration. Also, the range of adaptation is defined as the local coordinates system. Accordingly, synthesis processing can also be applied to cases wherein the glass is moving or the character is moving.

Figure 9:
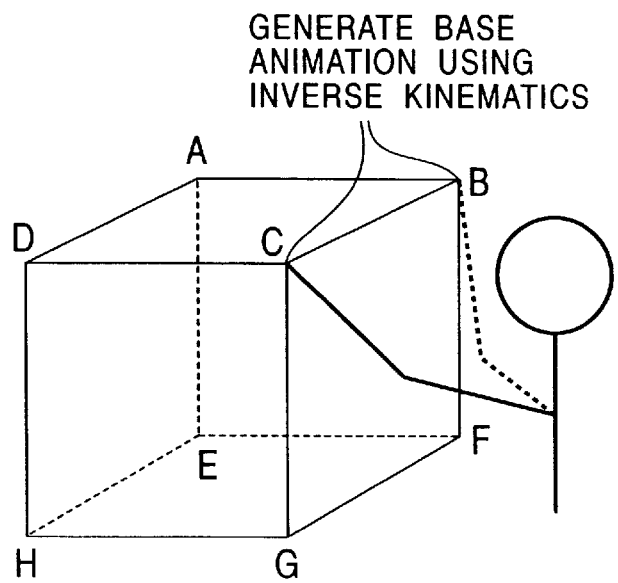
FIG. 9 is a diagram describing base animation according to the present embodiment.
Figure 10:
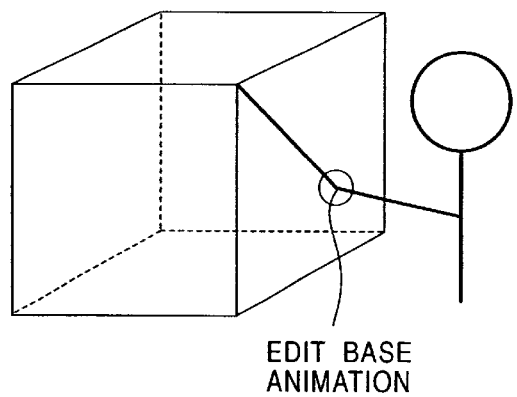
FIG. 10 is a diagram describing editing of the base animation according to the present embodiment.
Figure 11A:
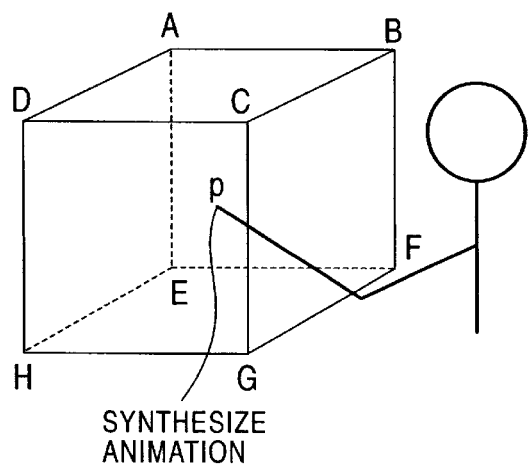
FIGS. 11A and 11B are diagram describing the process of synthesizing from the base animation according to the present embodiment.
Figure 11B:
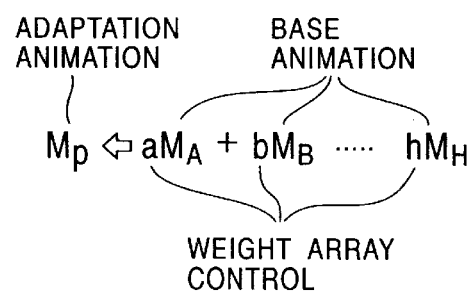

FIG. 9 illustrates the generation of animation serving as a base for generating adaptive motion. In this case, the range of adaptation as a cube. Animation is generated for the apexes A through H, using inverse kinematics. As shown in FIG. 10, the animation can be edited, so that in the event that the inverse kinematics generates multiple solutions they can be checked and the animation adjusted as necessary. As shown in FIGS. 11A and 11B, adaptive motion is generated by weighted addition performed on the animation. FIG. 11A illustrates the spatial relationship between the points A through H wherein stipulated animation has been specified, and point p is specified as the end effector position. FIG. 11B shows the computation method of generating the adaptive motion, illustrating how animation generation is carried out in the range of adaptation by appropriately changing coefficients a through h as a weight array.

FIGS. 5A through 5C are a series illustrating the time-sequence of the overall movement of the animation. First, the character is positioned in front of a table (FIG. 5A). At this time, the glass is situated on the table. The character plans to grasp the glass and raise it to a certain height. The character extends a hand to the glass, grasps it, and subsequently gradually raises the glass (FIG. 11B). FIG. 11C illustrates a state wherein the glass has been raised to the predetermined position.

FIGS. 6A through 6C illustrate the motion (indicated by heavy lines) in a case wherein the position of the glass has been offset somewhat from that shown in FIGS. 5A through 5C (indicated by light lines). As can be clearly understood from this diagram, having the glass in a different position changes the motion from that indicated by the light lines to that indicated by the heavy lines. Thus, the motion changes as appropriate depending on the position of the target (glass).

FIG. 7 illustrates the relationship between the character and range of adaptation. The range of adaptation moves synchronously with the character. When the character comes near to the table (glass) and as a result the glass enters the range of adaptation, adaptive animation generation becomes possible.

FIG. 8 illustrates the relationship between the range of adaptation and the character, with the range of adaptation being described by local coordinates of the character. The range of adaptation is, for example, a cube. In the event that a target (glass) is positioned within this range of adaptation, the end effector moves toward the target.

FIG. 9 demonstrates base animation. In this example, multiple sets of motion animation are prepared wherein the end effector heads for each grid point A through H of the range of adaptation. These multiple sets of motion animation form the base animation. Of course, the base animation may be prepared in relation with other candidate points within the range of adaptation. In this example, there is a fixed point defined on the character (see FIG. 8). Multiple sets of partial animation of the arm and hand portions are prepared as base animation centered on the fixed point. These sets of base animation are generated beforehand by a technique such as inverse kinematics. Also, the base animation may be edited as shown in FIG. 10, to yield a more natural appearing animation. Further, the base animation may be generated as necessary according to interactions with a user. What is more, base animation which is considered to be necessary to be created beforehand may be created and stored before starting animation generation.

FIGS. 11A and 11B illustrate the manner in which the base animation is synthesized. In this example, the end effector moves to the position p (FIG. 11A). Linear addition of the base animation is performed with predetermined coefficients as shown in FIG. 11B, thereby generating the desired animation (i.e., animation of the arm and hand parts). Known techniques can be used for synthesizing using linear addition. For example, the method discussed in Japanese Unexamined Patent Application Publication No. 2000-11199, "AUTOMATIC GENERATION METHOD FOR ANIMATION", the teaching of which is incorporated herein by reference, may be employed.

Figure 12:
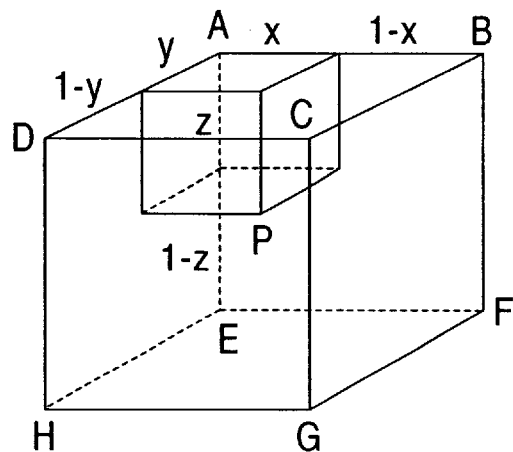
FIG. 12 is a diagram describing the technique for calculating functions for the synthesizing processing according to the present embodiment.
Figure 12:
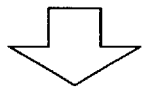
Figure 12:
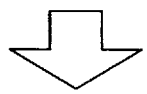

FIG. 12 illustrates the method for determining the weighting coefficient array (a, b, c, d, e, f, g, h). The length of each side of the range of adaptation has been normalized at 1. According to this determining method, the coefficient a is $X \times Y \times Z$ (z wherein the coordinates of the position p are (x, y, z). The coefficient b is $X \times (y-1) \times Z$. The other coefficients are obtained in the same manner. These coefficients are substituted into the expression shown in FIG. 11B, thereby generating the desired animation.

Figure 13A:
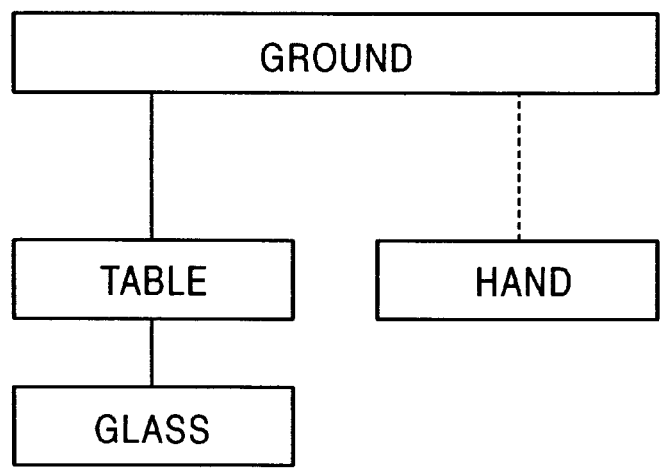
FIG. 13 is a diagram describing transition of a scene graph according to the present embodiment.
Figure 13B:
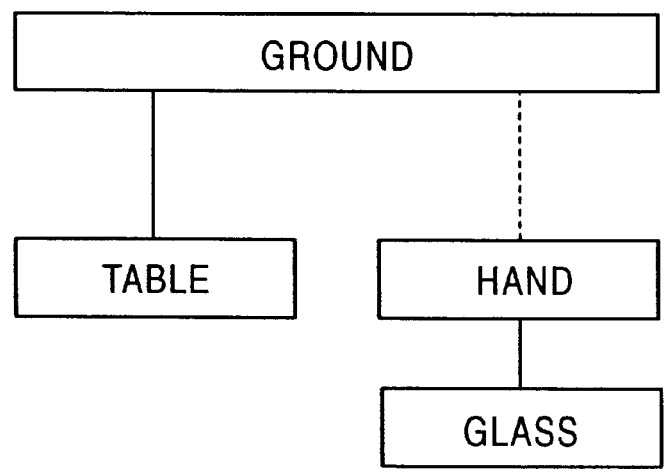

FIGS. 13A and 13B illustrate the change of a scene graph. Initially, as shown in FIG. 13A, there is a sub-graph of the table and glass with the ground as a base and a sub-graph of the hand with the ground as a base (the other parts of the character have been omitted here, and represented with a dotted line) in parallel with the sub graph of the table and glass. Then, once the action of grasping the glass with the hand has taken place (i.e., the animation wherein the base animation is synthesized ends), the glass is no longer connected to a node of the table, but to the node of the hand. Consequently, the glass subsequently moves in a natural manner according to the movement of the hand. Coordinate conversion calculations are made based on the ground, thereby doing away with positional change in the target (glass) before and after the action takes place.

Now, the operations for generating a new animation using a base animation will be described with reference to FIGS. 3 and 4.

The operation shown in FIG. 3 is carried out as described below.

Step S10: eventLeaveArea is reset (initialized). EventLeaveArea is an event indicating exiting the area of adaptation.

Step S11: A Judgment is made regarding whether or not the end effector is in the area of adaptation. In the event that the end effector is in the area of adaptation, the flow proceeds to step S12. Otherwise the process ends.

Step S12: Synthesizing of the base animation starts. Following execution of processing necessary for starting, the flow proceeds to step S13.

Step S13: In the event that the end effector has moved outside of the area of adaptation, the flow proceeds to step S15 where the synthesizing process is stopped. Otherwise, in the event that the end effector remains within the area of adaptation, data for the base animation at the current time is extracted and synthesized, and the current animation is displayed. Subsequently, the flow proceeds to step S14.

Step S14: A determination is made whether or not the synthesized animation has ended using eventEndMotion. In the event that the synthesized animation has ended, the process ends. If the synthesized animation has not ended, the time is incremented and the flow returns to step S13.

Step S15: The synthesizing process is stopped, and the process ends.

Thus, the above processing generates and displays the desired animation by synthesizing the base animation. This processing is repeatedly executed until the synthesized animation ends, or until the end effector exits the area of adaptation.

FIG. 4 indicates the processing for synthesizing and displaying the base animation, (step S13). This processing proceeds as follows.

Step S20: A Judgment is made regarding whether or not the end effector is within the area of adaptation. In the event that the end effector is in the area of adaptation, the flow proceeds to step S21. In the event that the end effector is outside of the area of adaptation, the flow proceeds to step S22.

Step S21: The weight array is calculated.

Step S22: The base animation is synthesized using the weight array, thereby generating the desired animation data.

Step S23: The current animation is displayed using the object animation data. T (true value) is returned, and the process ends.

Step S24: eventLeave is set, and the process ends.

Next, a modification of the above-described embodiment will be described. With this modification, the weight array calculation method (the part which calculates the weight distribution for the motions A through F at the point of providing the point P) described with reference to FIG. 12 is corrected.

Figure 15A:
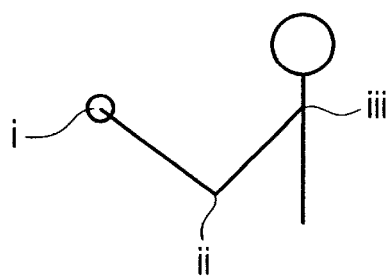
FIGS. 15A and 15B are diagrams describing problems to be solved by a modified embodiment.
Figure 15B:
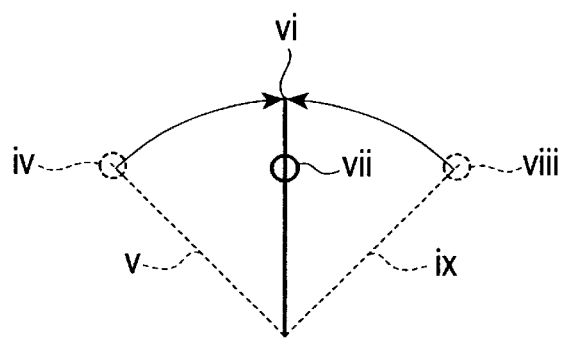

When obtaining the weight array of a motion satisfying an end effector position situated within the position of an end effector in a provided motion, in the event that the motion is made by simple interior division of the weight array, the expected end effector position may not be able to be obtained. FIGS. 15A and 15B demonstrate how this happens. In FIG. 15A, in the event that the arm is represented with two joints, the part indicated by the symbol i is the end effector, the part indicated by the symbol ii is the elbow joint, and the part indicated by the symbol iii is the fixed point. In FIG. 15B, in the event that the interior division point from v and vi is simply obtained with regard to a motion wherein iv and viii are at the end effector position, vi is displayed regardless of the fact that the target end effector position is vii.

Figure 16:
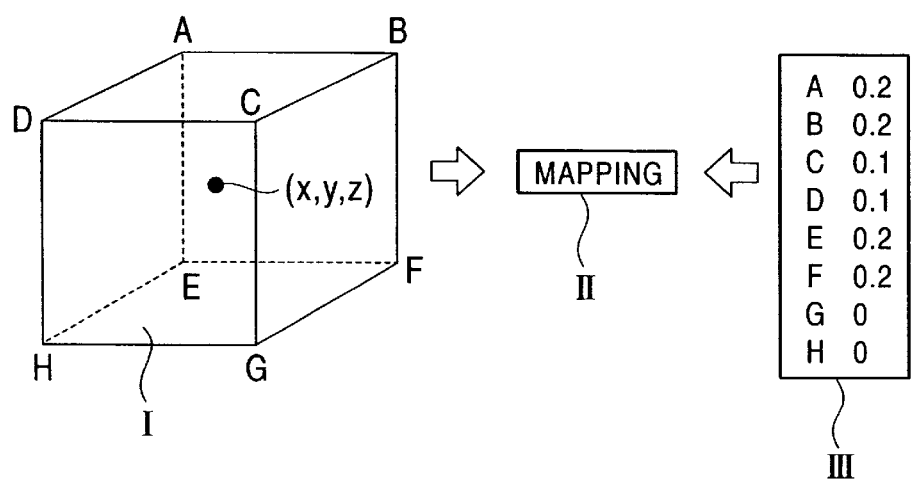
FIG. 16 is a diagram describing the configuration of a modification of the embodiment.

Accordingly, as shown in FIG. 16, the space coordinate system I is correlated with the weight array of the motion III. A self-organizing map II can be used to perform this correlation. For details of the self-organizing map, see "Self-Organizing Maps" by T. Kohonen.

However, performing mapping for all space points is not realistic. Therefore, a method is needed for obtaining a weight array so as to be smaller than the margin of tolerance between the end effector position and the actually obtained position.

Figure 17:
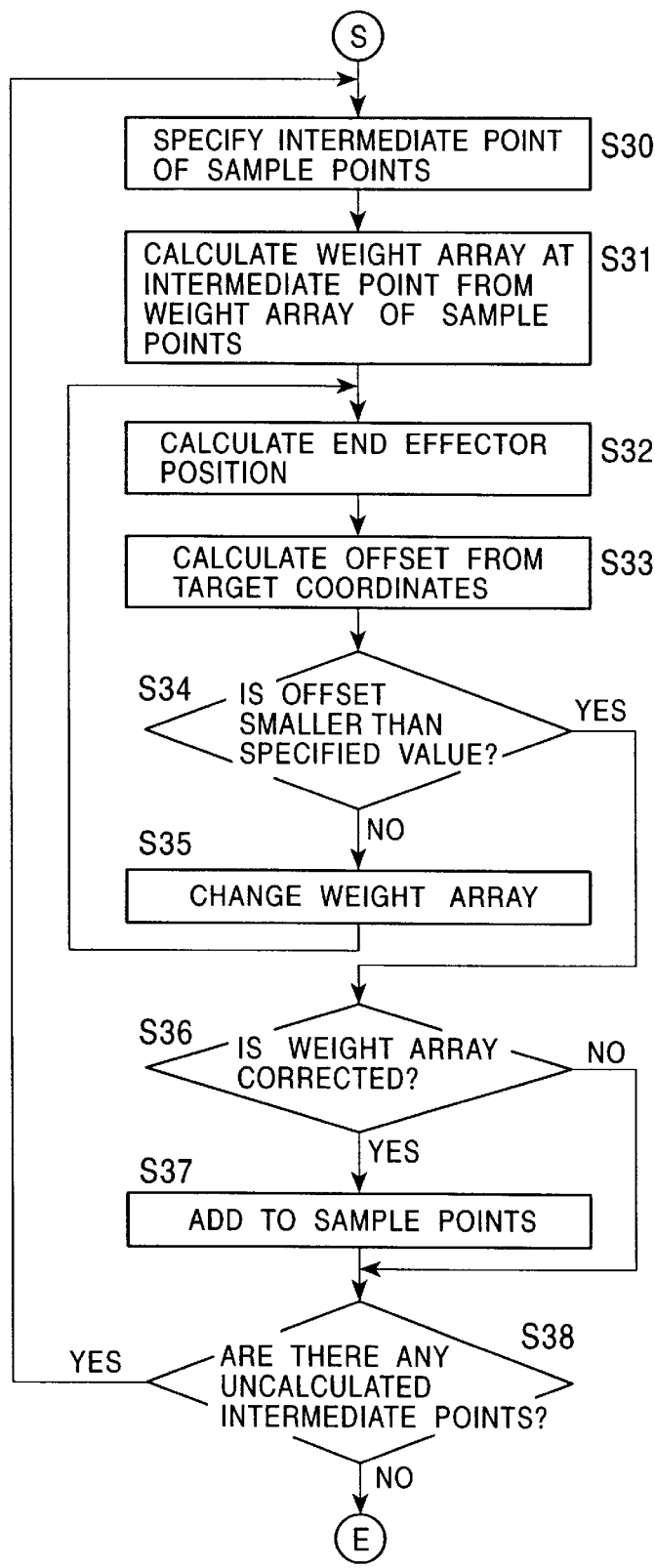
FIG. 17 is a flowchart describing the action of the modified embodiment.

The flow of such a process is shown in FIG. 17. An intermediate point is obtained from sample points provided beforehand (S30). The weight array at the intermediate point is calculated from the weight array mapped at the sample points upon which the intermediate point is based (S31). At this time, an average value is specified as a first approximation. Next, the position of the end effector is calculated from the joint angles specified as motions at the sample points and the weight arrays thereof. This calculation may be performed by using forward kinematics (S32). Forward kinematics is a technique wherein the relation between the joints is allowed to act forwardly. For example, in FIGS. 15A and 15B, the change in joint angle acts from iii onto ii, and from ii onto i, thereby obtaining the position of the end effector.

The offset between the end effector position obtained here, and the target coordinates is obtained in step S33. In step S34 a determination is made whether the offset calculated in S35 is within the specified margin of tolerance. In the event that the offset is greater than the specified margin of tolerance the weight array is changed somewhat and the flow returns to the step of calculating the end effector position S35.

On the other hand, in the event that the offset is determined to be within the tolerance range at step S34, at step S36 it is determined whether there is change in the weight array from the initial state. If so, the intermediate point thereof is added to the group of sample points at step S37. Next a determination is made at step S38 whether there is an uncalculated intermediate point existing in the sample point group. If so, the flow returns to the step of specifying the intermediate point S30. Otherwise, the processing ends at the point in time where all intermediate points are gone.

Thus, mapping can be performed wherein a sample weigh array for an arbitrary space position can be obtained within a tolerance range.

Figure 18:
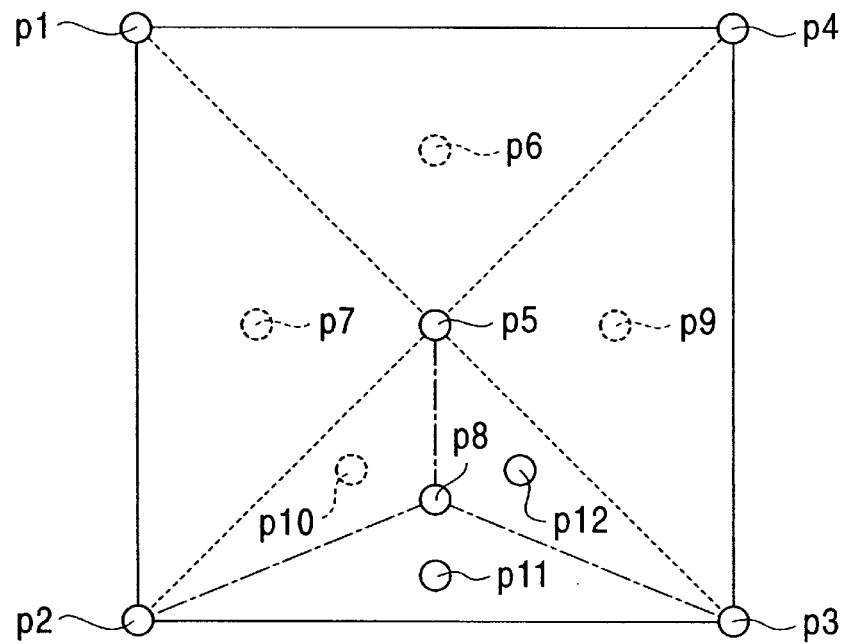
FIG. 18 is a diagram describing the action of the modified embodiment.

This situation is illustrated in FIG. 18. In FIG. 18, points p1 through p4 indicate sample points that are initially provided. From these the intermediate value of point p5 is obtained, thereby obtaining a corrected weight array. Because the weight array has changed, additions are made to the sample point group, such that points p6 through p9 are newly generated as intermediate points. In FIG. 18, points p6, p7, and p9 have not been subjected to weight array correction. Accordingly, these three points have not been added to the sample point group. Conversely, point p8 is added as a sample point. Points p10, p11, and p12 are generated as intermediate values, and the weight array correction is made for p11 and p12. This processing is repeated until no more intermediate points are generated.

Figure 19:
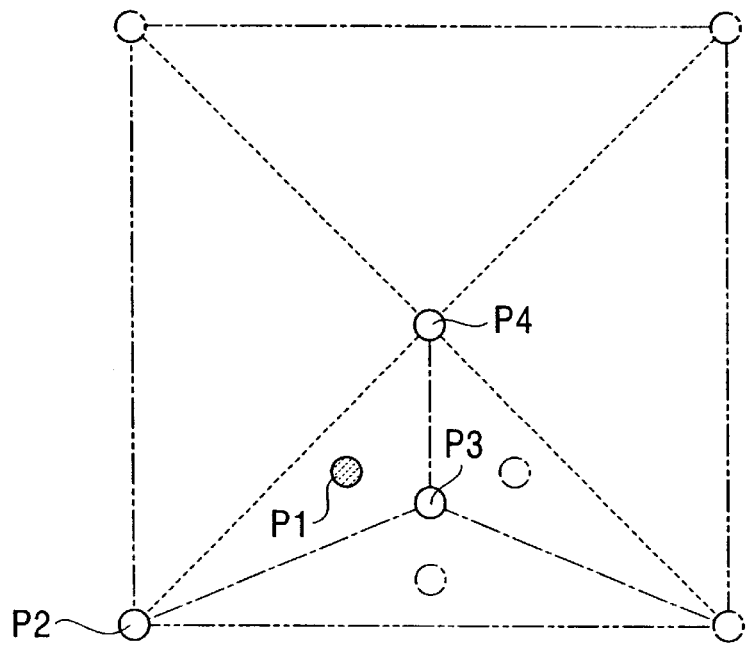
FIG. 19 is another diagram describing the action of the modified embodiment.

Next, as shown in FIG. 19, in the event that a coordinate point P1 is provided, a weight array is obtained by interpolation from the sample points P2 through P4 making up the range containing the coordinate point P1.

Figure 14:
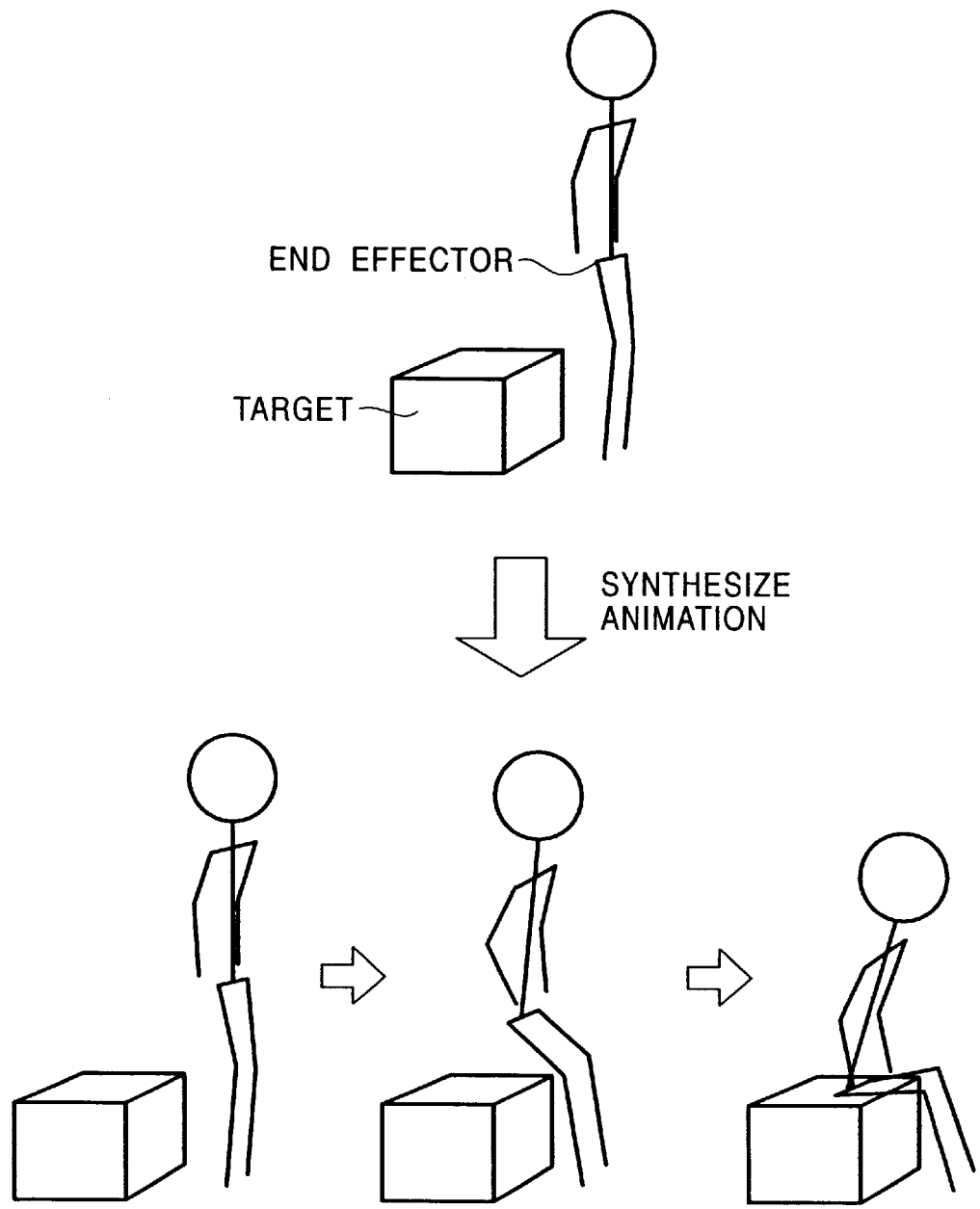
FIG. 14 is a diagram describing an example wherein the present embodiment is applied to an action of a character sitting down on a chair.

Note that the present invention is by no means restricted by the above-described embodiments. Rather, various alterations and modifications may be made without departing from the inventive concept disclosed herein. For example, though the above example stipulates the end effector as being a hand, other arbitrary parts of an animation can be stipulated as the end effector. FIG. 14 shows an example of an action of sitting down on a set with the hips stipulated as the end effector.

Also, though the description involved animation being synthesized using base animation of grid points in the event that the end effector is within the range of adaptation, candidate points making up the base animation may be set at arbitrary points of the range of adaptation. Also, the candidate points may be set outside of the range of adaptation. That is to say, candidate points corresponding to the base animation may be employed in a manner unrelated to a certain extent to the range of adaptation stipulating the conditions for generating motion at the time of execution.

As described above, according to the present invention, cooperative action with other animation can be realized in real-time animation generation by predicting portions in animation necessitating interactivity, and stipulating the cooperative relation between sets of animation at that part. Further, employing the present invention enables reduction in the amount of calculation as compared to methods using real-time inverse kinematics, and further, undesirable actions can be reduced. Accordingly, the efficiency of animation production can be markedly improved over currently-employed techniques.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An animation generation method for generating coordinated animation of a predetermined object of display with animation of a separate object of display, said method comprising the steps of:

storing animation of a plurality of motions of said predetermined object of display, each respectively corresponding to a plurality of relationships with animation of said separate object of display;

synthesizing animation of a motion corresponding to the current relationship, using animation of said plurality of motions, based on said current relationship with animation of said separate object of display;

wherein animation of said plurality of motions of said object of display are sets of animation which can be taken at the time of execution corresponding to each of said plurality of relationships with animation of said separate object of display, and which have been calculated beforehand based on said plurality of relationships.

2. The animation generation method according to claim 1, wherein said sets of animation which have been calculated beforehand can be freely re-set or adjusted.

3. The animation generation method according to claim 1, wherein said sets of animation which have been calculated beforehand have end effectors, and wherein said end effectors are used as dynamically changing targets regarding said separate animation to be displayed.

4. The animation generation method according to claim 3, wherein said sets of animation which have been calculated beforehand are calculated using inverse kinematics.

5. The animation generation method according to claim 4, wherein said calculation of inverse kinematics is performed when interacting with a user.

6. The animation generation method according to claim 3, wherein said sets of animation which have been calculated beforehand are created as key frame animation.

7. The animation generation method according to claim 1, wherein a scene graph of a model is dynamically changed, corresponding to relationships with animation of said separate object of display.

8. The animation generation method according to claim 1, wherein animation of said plurality of motions of said predetermined object of display are sets of animation regarding one part.

9. An animation generation method for generating animation by coordinating animation of a predetermined object of display with animation of a separate object of display, said method comprising the steps of:

storing animation of a plurality of motions of said predetermined object of display, at a time when each end effector of said predetermined object of display moves to a plurality of candidate points within a predetermined space area, synchronously with animation of said predetermined object of display; and synthesizing animation wherein said end effector of said predetermined object of display moves to said separate object of display, from animation of said plurality of motions to said predetermined object of display.

10. An animation generation method for generating animation by coordinating animation of a predetermined object of display with animation of a separate object of display, said method comprising the steps of:

storing animation of a plurality of motions of said predetermined object of display, at a time of each end effector of said predetermined object of display moving to a plurality of candidate points within a predetermined space area, synchronously with animation of said predetermined object of display; and synthesizing animation wherein said end effector of said predetermined object of display moves to said separate object of display, from animation of said plurality of motions to said predetermined object of display, when said separate object of display is within said predetermined space area.

11. An animation generation method according to claim 10, wherein animation of said end effector of said predetermined object of display moving to said separate object of display is synthesized from animation of said plurality of motions of said predetermined object of display, based on the distance between the position of said separate object of display within said predetermined space area and said plurality of candidate points.

12. An animation generation apparatus for generating animation by coordinating animation of a predetermined object of display with animation of a separate object of display, said apparatus comprising:

means for storing animation of a plurality of motions of said predetermined object of display, respectively corresponding to a plurality of relationships with animation of said separate object of display;

means for synthesizing animation of a motion corresponding to the current relationship, using animation of said plurality of motions to be displayed, based on said current relationship with animation of said separate animation to be displayed;

wherein animation of said plurality of motions of said object of display are sets of animation which can be taken at the time of execution corresponding to each of said plurality of relationships with animation of said separate object of display, and which have been calculated beforehand based on said plurality of relationships.

13. An computer-readable medium storing a computer program used for generating animation by coordinating animation of a predetermined object of display with animation of a separate object of display, said program comprising:

code for executing a step for storing animation of a plurality of motions of said predetermined object of display, respectively corresponding to a plurality of relationships with animation of said separate object of display;

code for executing a step for synthesizing animation of a motion corresponding to the current relationship, using animation of said plurality of motions, based on said current relationship with animation of said separate object of display; wherein animation of said plurality of motions of said object of display are sets of animation which can be taken at the time of execution corresponding to each of said plurality of relationships with animation of said separate object of display, and which have been calculated beforehand based on said plurality of relationships.

* * * * *